United States Patent
Kritskiy et al.

(10) Patent No.: US 11,289,223 B2
(45) Date of Patent: Mar. 29, 2022

(54) POWER PLANT CHEMICAL CONTROL SYSTEM

(71) Applicants: Joint Stock Company Scientific Research and Design Institute for Energy Technologies ATOMPROEKT, St. Petersburg (RU); Joint Stock Company "Science and Innovations", Moscow (RU)

(72) Inventors: Vladimir Georgievich Kritskiy, St. Petersburg (RU); Nikolay Aleksandrovich Prokhorov, St. Petersburg (RU); Fedor Vladimirovich Nikolaev, St. Petersburg (RU); Pavel Semenovich Styazhkin, St. Petersburg (RU)

(73) Assignees: JOINT STOCK COMPANY SCIENTIFIC RESEARCH AND DESIGN INSTITUTE FOR ENERGY TECHNOLOGIES ATOMPROEKT, St. Petersburg (RU); JOINT STOCK COMPANY "SCIENCE AND INNOVATIONS", Moscow (RU)

( * ) Notice: Subject to any disclaimer, the term of this patent is extended or adjusted under 35 U.S.C. 154(b) by 0 days.

(21) Appl. No.: 16/089,774

(22) PCT Filed: Jun. 30, 2017

(86) PCT No.: PCT/RU2017/000473
§ 371 (c)(1),
(2) Date: Sep. 28, 2018

(87) PCT Pub. No.: WO2019/004856
PCT Pub. Date: Jan. 3, 2019

(65) Prior Publication Data
US 2020/0381132 A1    Dec. 3, 2020

(51) Int. Cl.
*G21D 3/00* (2006.01)
*G01N 17/02* (2006.01)
(Continued)

(52) U.S. Cl.
CPC ............ *G21D 3/001* (2013.01); *G01N 17/02* (2013.01); *G21C 17/022* (2013.01); *G21D 3/04* (2013.01); *G21D 3/10* (2013.01)

(58) Field of Classification Search
CPC ............ G21D 3/001; G21D 3/04; G21D 3/10; G01N 17/02; G21C 17/022; Y02E 30/00; Y02E 30/30
See application file for complete search history.

(56) References Cited

U.S. PATENT DOCUMENTS

| 3,956,063 A | * | 5/1976 | Johnson | G21C 15/18 376/282 |
| 4,138,320 A | * | 2/1979 | Grantz | G21C 9/027 376/337 |

(Continued)

FOREIGN PATENT DOCUMENTS

| CN | 101477843 A | * | 7/2009 |
| EP | 0417571 | | 3/1991 |
| RU | 2326372 | | 6/2008 |

OTHER PUBLICATIONS

Kuang et al. (CN 101477843 A, machine translation). (Year: 2009).*

(Continued)

*Primary Examiner* — Joshua L Allen
(74) *Attorney, Agent, or Firm* — Brandon V. Zuniga; James R. Gourley; Carstens & Cahoon, LLP

(57) ABSTRACT

Chemical control system for a power plant including at least one coolant electrochemical indication sensor of a flow type electrically connected to the measurement data processing and transmission unit with its outlet connected to a central computer (CPC) controlling the actuator for injection of (Continued)

hydrogen and chemical reagents. The hydraulic inlet of the electrochemical sensor in use of the system is connected by a sampling tube to the power plant process circuit and its hydraulic outlet is hydraulically connected to the first heat exchanger and the first throttling device with a coolant supply circuit in series. The sampling tube is configured to pass a coolant sample to the coolant electromechanical sensor and the coolant supply circuit contains tubes and valves configured to reverse the flow of the coolant sample through the first throttling device.

5 Claims, 3 Drawing Sheets

(51) Int. Cl.
*G21C 17/022* (2006.01)
*G21D 3/04* (2006.01)
*G21D 3/10* (2006.01)

(56) References Cited

U.S. PATENT DOCUMENTS

| | | | | | |
|---|---|---|---|---|---|
| 5,203,984 | A | * | 4/1993 | Sakai | G01N 27/30 204/435 |
| 5,323,429 | A | * | 6/1994 | Roarty | G21C 17/017 376/249 |
| 5,579,354 | A | * | 11/1996 | Sakai | G01N 17/02 376/245 |
| 8,797,021 | B2 | * | 8/2014 | Marshall | G21C 17/022 324/149 |
| 2007/0017822 | A1 | * | 1/2007 | Gill | G01N 17/02 205/775.5 |
| 2008/0283418 | A1 | * | 11/2008 | Jovancicevic | G01N 17/02 205/775.5 |
| 2009/0184003 | A1 | * | 7/2009 | Hammonds | G01N 17/04 205/775.5 |
| 2011/0209730 | A1 | * | 9/2011 | Varrin, Jr | B08B 9/00 134/22.19 |
| 2012/0279874 | A1 | * | 11/2012 | Lawrence | G01N 27/4167 205/787.5 |
| 2013/0153473 | A1 | * | 6/2013 | Brunsell | C02F 9/00 210/85 |
| 2013/0182808 | A1 | * | 7/2013 | Reyes, Jr | G21C 7/32 376/214 |

OTHER PUBLICATIONS

"Actuator" Wikipedia, Way Back Machine Internet Archive entry for http://en.wikipedia.org/wiki/Actuator on Feb. 9, 2017, https://web.archive.org/web/20170209073923/https://en.wikipedia.org/wiki/Actuator (last accessed Oct. 19, 2021) (4 pages).

* cited by examiner

POWER PLANT CHEMICAL CONTROL SYSTEM

CROSS-REFERENCE TO RELATED APPLICATIONS

This application is a U.S. 371 Application from PCT/RU2017/000473 filed Jun. 30, 2017, the technical disclosures of which are hereby incorporated herein by reference.

TECHNICAL FIELD

The invention relates to power engineering, in particular, to process control devices for ensuring reliable operation of the power plant equipment using process circuit water chemistry control means.

BACKGROUND OF THE INVENTION

Power plants, including nuclear power plants (NPPs) with water-cooled reactors, relate to highly technical and complex facilities. Given that the energy source at these facilities is a controlled nuclear fission reaction, closer attention is paid to assurance of safe and reliable operation of such power plants. Maintenance of the required water quality of the primary and secondary circuits of nuclear power plants is one of essential conditions ensuring safe, reliable and cost-efficient operation of NPPs (refer to NP-001-15 "General Safety Provisions for Nuclear Power Plants" at https://www.seogan.ru/np-001-15). Chemical control systems are designed to ensure receipt of the latest information about the water chemistry condition based on the measurements of the rated and diagnostic parameters of the process circuit aqueous media. Management of water chemistry quality indices is based on the data received from the chemical control systems. The scope or composition of the measured quality indices shall ensure receipt of sufficient information for relevant assessments of the current process circuit water chemistry condition and the corrosion of the equipment in these circuits. The collection, processing, archiving and display of the chemical control data shall be ensured by the system-level application of modern hardware and software products. (STO 1.1.1.03.004.0980-2014 "Water Chemistry of the Primary Circuit during Commissioning of the Nuclear Power Plant Unit under AES-2006 Project. Coolant Quality Standards and Supporting Means". STO1.1.1.03.004.0979-2014 "Water Chemistry of the Secondary Circuit during Commissioning of the Nuclear Power Plant Unit under AES-2006 Project. Working Medium Quality Standards and Supporting Means" at http://www.snti.ru/snips_rd3.htm).

A system for monitoring and protecting pipelines against corrosion is disclosed (refer to Patent RU2200895; IPC F16L 58/00; published on Mar. 20, 2003), including a pipeline; two to eight independent control channels, each containing a corrosion rate sensor comprising a corrosion measuring transducer and a sensor interface device; and an actuator for inhibitor injection comprising a dispenser and a dispenser interface device; wherein a microcontroller is integrated into each channel of the system connected to the device designed for control, processing and storage of information by a computer.

The disadvantage of the disclosed system is its failure to ensure reliable operation of power plants, for example, for the primary and secondary circuits with water-cooled water-moderated power reactors (VVER type reactors) and pressurized water reactors (PWRs) at the design power, in transient modes or in cleaning, passivation and outage modes. The system does not take into account any essential differences in the parameters of the filling medium conditions and process circuit hydraulic characteristics, even within the same power plant, as compared to any pipeline route.

A chemical control system for the coolant of a water-cooled reactor is disclosed (refer to JP2581833, IPC G01N 17/02, published on Feb. 12, 1997), including an electrochemical potential sensor installed in the coolant and connected to a potentiostat with its output further connected to a computer equipped with a memory unit and a monitor. The computer is connected to an actuator for gas or chemical reagent injection.

The disadvantage of the disclosed system is arrangement of sensors in the active evaporation area, as well as directly in the neutron field. As is known, many materials, including elements of insulating materials and conductor wires of the sensors, when exposed to neutrons, change their physical and mechanical properties. The period of reliable operation of sensors of the disclosed system is clearly less than that in the neutron field compared to the duration of operation of similar equipment beyond its limits, and sensors may be replaced only during the shutdown of the power unit for refueling. In addition, in the active evaporation area, the measured values, especially the concentrations of dissolved gases, will fluctuate to a great extent. Averaging of these values in due course will lead to an underestimation of the actual amount of injected hydrogen and other reagents due to migration of the dissolved gases into bubbles, the capture of reagents by corrosion products then, when further concentrated and deposited, on the heat transfer surface of the fuel. Consequently, the hydrogen and other reagents metering control will be conservatively overestimated by the amount of an uncertainty related to dispersion in the readings of the disclosed system sensors.

A power plant chemical control system is disclosed, which coincides with this engineering solution in the maximum number of essential features and is accepted as a prototype (EP0661538, IPC G01N 17/02, G21C 17/02, published on Jul. 5, 1995). The prototype system includes installation of a coolant electrochemical indication sensor in the reactor core and its connection for corrosion potential calculation to the measuring data processing and transmission unit with its output connected to the central computer system operating the actuator for hydrogen and chemical reagents injection. The system may also include a dissolved oxygen sensor, a hydrogen peroxide sensor, an electrical conductivity sensor, and a pH sensor.

Location of the coolant electrochemical indicator sensor in the reactor core minimizes the transport lag time (the period of time between the sample exit from the sampling point and the achievement of the sampling sensor). The disadvantage of the disclosed system is that under the conditions of a powerful radiation field of the reactor core, the duration of operation of sensors and system elements is less compared to the duration of operation of similar equipment beyond its limits, and replacement of sensors and system elements is possible only during power unit shutdown for refueling. All elements of the system are to be replaced due to high induced activity, including electrodes of the polarization resistance sensor. At the same time, regular updating of the sensor surface state when changing them reduces the reliability of the predictive estimates of corrosion wear, since the overall corrosion decreases over time along the parabola, while corrosion properties of the medium remain unchanged. In case of water chemistry quality fluctuations, the response function of the replaced electrodes with the surface oxide film differing significantly from that formed on the surface of the circuit equipment over a long period, will be less reliable for substantiating the selection of quantitative characteristics and the use of the coolant parameters optimization means.

INVENTION DISCLOSURE

The objective of this engineering solution is to develop such a power plant chemical control system that would ensure a longer service life of the sensors while maintaining reliable values of the rated and diagnostic parameters of the water media in process circuits at power, transient modes or in cleaning, passivation and outage modes.

The stated objective is achieved by the fact that the power plant chemical control system includes at least one coolant electrochemical indication sensor electrically connected to the measurement data processing and transmission unit, with its output connected to a central programmable controller for the actuator for injection of hydrogen and chemical reagents. The coolant electrochemical indication sensor is of a flow type, its hydraulic input is connected by a sampling tube to the process circuit of the power plant, and its hydraulic output is hydraulically connected to the first heat exchanger and the first throttling device with a reversible coolant supply circuit in series.

Removal of the coolant electrochemical indication sensor from the heavy-duty radiation field of the reactor core provides for a longer service life of the sensor. In this case, the sample coolant passing through the sensor is discharge into the drain line through the first heat exchanger to reduce the coolant temperature and the throttling device to reduce pressure and flow rate. In order to avoid a decrease in the flow rate of the coolant sample, and thus to extend the transport lag time due to the gradual clogging of the throttling device with iron corrosion products leading to reduction in the diameter of the throttling device opening, the throttling device is provided with a reversible coolant supply circuit that maintains a constant flow rate of the sample through the coolant electrochemical indication sensor. The reverse circuit is especially important when the reactor is operated in transient modes (start-up, shutdown), when the power unit capacity is changed, including emergency trips. Changes in the reactor/boiler unit power or switching of the pumps are accompanied by an increase in the coolant of suspended insoluble particles of corrosion products forming the surface loose and poorly adherent to the dense protective oxide films deposits under stationary conditions. The reversible circuit in these cases ensures maintenance of the constant sample flow through electrochemical sensors, which ensures receipt of reliable values of rated and diagnostic parameters of the aqueous media in the process circuits.

The coolant electrochemical indication sensor may be made in the form of a flow-type sensor of the polarization resistance.

The coolant electrochemical indication sensor may be made in the form of a flow-type sensor of the electrochemical potential.

The coolant electrochemical indication sensor may be installed in the primary process circuit of the power plant.

The working coolant electrochemical indicator sensor may be installed in the secondary process circuit of the power plant.

The chemical control system of the power plant may include a dissolved oxygen sensor, and/or a dissolved hydrogen sensor, and/or an electrical conductivity sensor, and/or a pH sensor mounted between the second heat exchanger hydraulically connected to the process circuit of the power plant and the second throttling device or the installed after the throttling device.

The coolant electrochemical indication sensors of this chemical control system of the power plant can be installed in the process circuits of various power plants: circulation circuits of boiling-type reactors, such as BWR (boiling water reactor) and RBMK (high power channel reactor), in the primary and secondary circuits of the NPPs with PWR and VVER reactors, in the circuits of thermal stations. But as an example, the power plant chemical control system of the primary circuit of a pressurized light-water reactor is considered below.

BRIEF DESCRIPTION OF THE DRAWINGS

This power plant chemical control system is illustrated by the drawing, where.

THE BEST EMBODIMENT OF THE INVENTION

Figure 1:
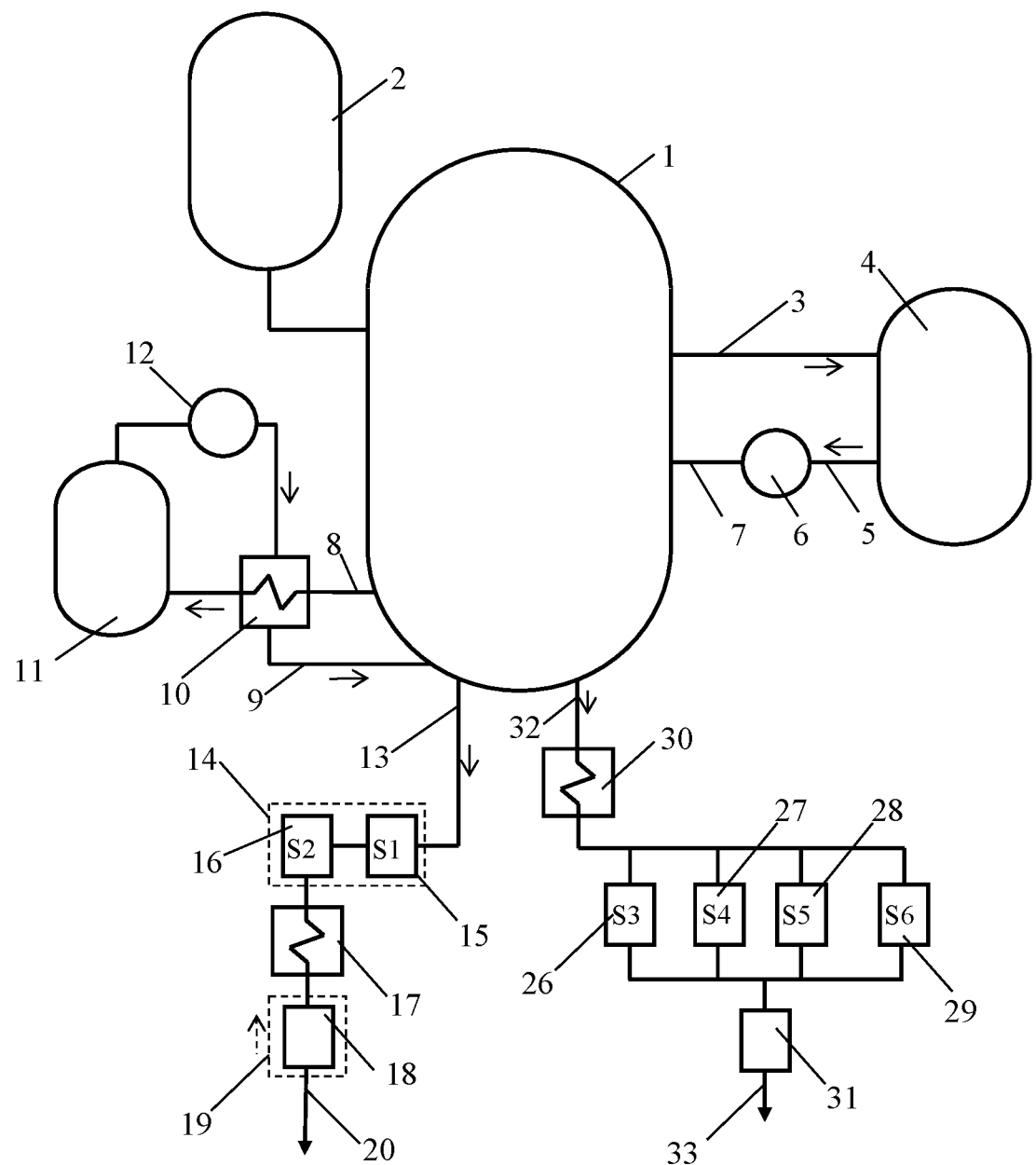
FIG. 1 shows a hydraulic circuit diagram of the primary circuit of the pressurized light-water reactor with the power plant chemical control system.
Figure 2:
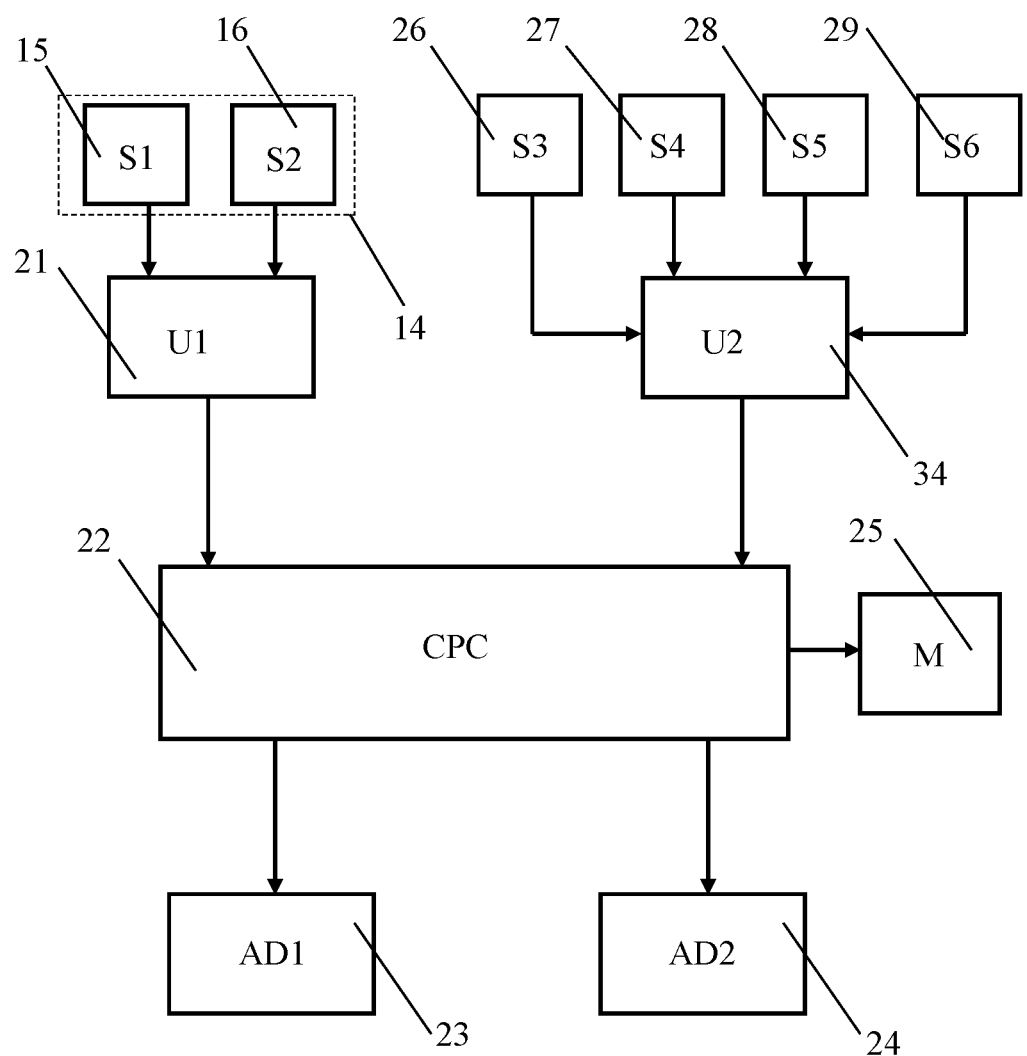
FIG. 2 shows an electric circuit diagram of the power plant chemical control system.
Figure 3:
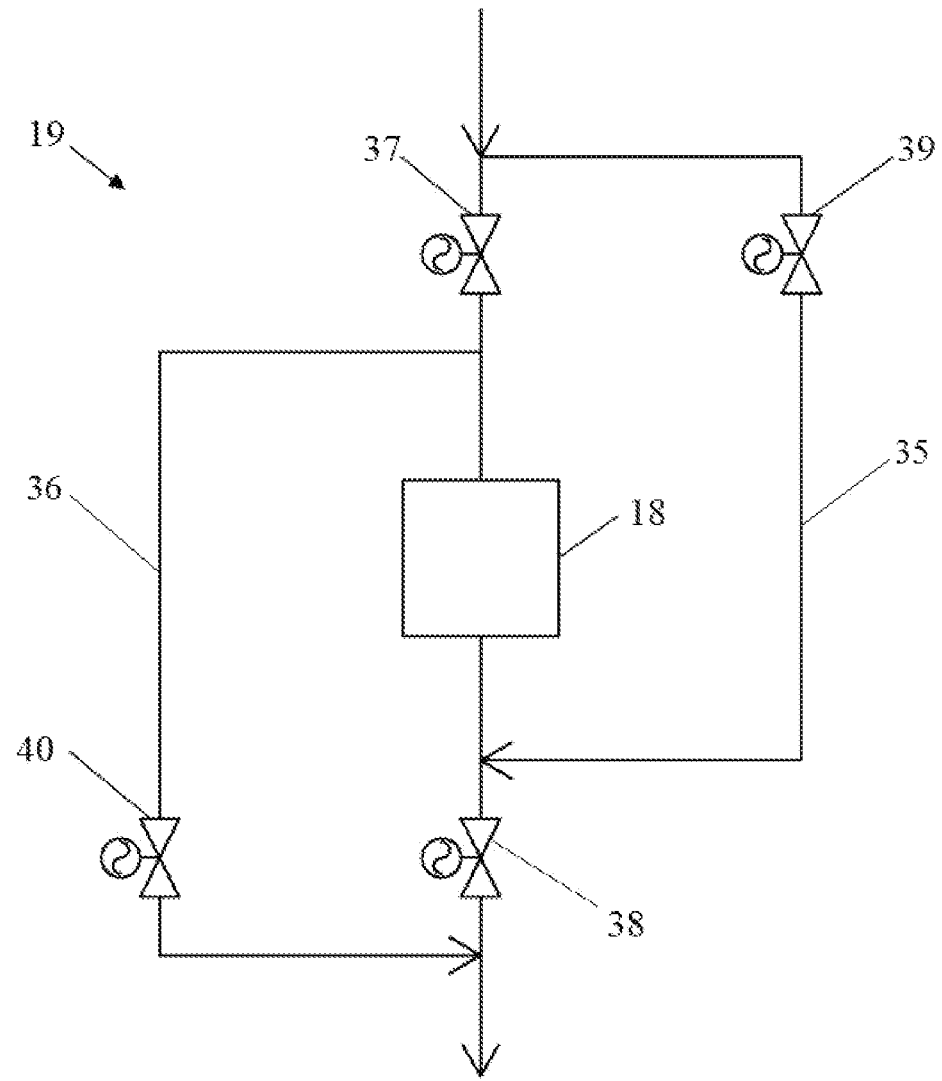
FIG. 3 shows a circuit diagram of the throttling device with a reversible coolant supply circuit.

The primary circuit of the power plant with a chemical control system (refer to FIG. 1) consists of a reactor pressure vessel (1) with a pressurizer (2), the primary circulation circuit equipment, including pipeline (3) for the heated coolant supply to the steam generator (4) and its return through the pipeline (5), the main circulation pump (6) through the pipeline (7) to the reactor pressure vessel (1). The system for controlling and maintaining the primary circuit water chemistry quality includes an outlet (8) and an inlet pipelines (9) connecting the reactor pressure vessel (1) to the equipment of the blowdown and makeup systems consisting of a regenerative heat exchanger (10), a coolant purification system on ion-exchange filters (11), and a makeup pump (12). The reactor pressure vessel (1) is hydraulically connected by a sampling tube (13) to the flow-type sensor (14) for the coolant electrochemical indication, for example, comprising a polarization resistance sensor "S1" (15) and an electrochemical potential sensor "S2" (16) that are hydraulically connected in series with the first heat exchanger (17) and the first throttling device (18) with a reversible coolant supply circuit (19). S1 (15) and S2 (16) may be connected in series (as shown in FIG. 1) or in parallel, depending on their structure and operating conditions. The first throttling device (18), for example, can be made in the form of a housing with inlet and outlet nozzles, wherein a set of throttling orifices is installed (not shown in the drawing). The hydraulic outlet of the first throttling device (18) is connected to the first drain line (20). The flow-type sensor "S1" (15) of the polarization resistance and the flow-type sensor "S2" (16) of the coolant electrochemical indication of the unit (14) (refer to FIG. 2) are electrically connected to the inlets of the first measurement data processing and transfer unit "U1" (21) with an outlet connected to a central computer, CPC (22), the control actuator "AD1" (23) for hydrogen injection and the actuator "AD2" (24) for injection of chemical reagents. The CPC (22) is equipped with a monitor (25) for visual control of the measurement data by the operator and making of managerial decisions during the power unit operation. S1 (15) and S2 (16), the first heat exchanger (17), the first throttling device (18) with a reversible circuit (19) and a measurement data processing and transfer unit "U1" (21) are located within the sealed reactor circuit and are not available for maintenance when operated at power. The chemical control system of the power plant may include (refer to FIG. 1), for example, a dissolved oxygen sensor "S3" (26), a dissolved hydrogen sensor "S4" (27), an electrical conductivity sensor "S5" (28) and a pH sensor "S6" (29) installed between the second heat exchanger (30) and the second throttling device (31), according to the structure of the first throttling device (18) (refer to FIG. 1), or may be installed after the second throttling device (31). S3 (26), S4 (27), S5 (28) and S6 (29) may be connected in parallel (as shown in FIG. 1) or in series, depending on their structure and operating conditions. The inlet of the second heat exchanger (30) can be hydraulically connected to the reactor pressure vessel (1) by removal from the tube (13) (one entry point) or by a sampling tube (32) (two entry points, as shown in FIG. 1). The second drain line (33) is designed for coolant samples passing through S3 (26), S4 (27), S5 (28) and S6 (29). S3 (26), S4 (27), S5 (28) and S6 (29) are electrically connected (refer to FIG. 2) to the second measurement data processing and transmission unit "U2" (34), the outlet of the U2 (34) is connected to the central computer (22). S3 (26), S4 (27), S5 (28) and S6 (29) are located outside of the sealed circuit of the reactor, and they are available for servicing when operated at power. Cooling of the sample in the second heat exchanger (30) creates acceptable operating conditions for the low-temperature sensors S3 (26), S4 (27), S5 (28) and S6 (29) and, in combination with the second throttling device (31), allows to reduce the pressure and to stabilize the sample medium flow rate, ensuring acceptable, according to the technical requirements, discharge of the spent sample into the second drainage line (33). FIG. 3 shows the first throttling device (18) with more detailed picture of the reversible coolant supply circuit (19). The reversible circuit (19) contains tubes (35, 36) for the reversible coolant sample supply and valves (37, 38, 39, 40) ensuring the reverse flow of the sample through the first throttling device (18). In case of forward direction of the sample flow through the first throttling device (18) towards the first drain line (20) (FIG. 1 and FIG. 2), the valves 37 and 38 are open and valves 39 and 40 are closed. The reverse flow of the sample through the first throttling device (17) during its flushing occurs if valves 37 and 38 are closed and valves 39 and 40 are open.

This chemical control system of the power plant works as follows. The primary circuit coolant is automatically fed from the standard sampling points through the tube (13) to the set (14) of flow-type sensors for the electrochemical indication of the coolant containing, for example, S1 (15) for polarization resistance and S2 (16) for electrochemical potential; then the sample flow passes the first heat exchanger (17) and the first throttling device (18) with a reversible coolant supply circuit (19) for cleaning of the throttling device (18). The first heat exchanger (17) and the first throttling device (18) provide optimum values for the temperature, pressure and flow rate of the sample into the drain line (20). The signals from S1 (15) and S2 (16) are sent to the measurement data processing and transmitting unit U1 (21) and further to the CPC (22). At the same time, the working medium is fed through tube 32 (in one process connection option) or through tube 13 (in another process connection option) to the second heat exchanger (30) and passes at room temperature through S3 (26), S4 (27), S5 (28) and S6 (29) measuring the rated and diagnostic parameters related to the quality of the process circuit medium. The sample flow then passes through the second throttling device (31) and enters the drain line (33). The signals from S3 (26), S4 (27), S5 (28) and S6 (29) are sent to U2 (34) and then to the CPC (22). In the CPC (22), the processed measurement results of S (15), S2 (16), S3 (26), S4 (27), S5 (28) and S6 (29) are used to justify management decisions during power unit operation. Occasionally, the inner surfaces of the first throttling device (18) are cleaned from the iron corrosion products that are slightly adherent to the surface by changing the direction of the sample flow using valves 37, 38, 39, 40 of the reversible circuit (19). It is recommended to change the direction of the sample flow through the first throttling device (18) with a decrease in the sample flow rate by half compared to the initial value in the steady-state regime and, to prevent it, at the end of each transient mode stage. Regular flushing of the first throttling device (18) allows to keep the transport lag time and the stability of the sample flow to the sensitive elements of S1 (15), S2 (16), S3 (26), S4 (27), S5 (28) and S6 (29), which ensures receipt of reliable values of the rated and diagnostic parameters of the process circuit aqueous media during power operation, in transient modes or during washing, passivation and in outage modes. Selection of the values of rated and diagnostic quality parameters of the water chemistry of the process circuit by the criterion of the minimum corrosion activity of the filling medium and maintenance of the values within certain limits are required for safe operation of the power unit. In case of deviations in the parameter values beyond the established boundaries, actions are taken to correct violations within a specified time. If it is impossible to eliminate the causes for deviations in the measured parameter values of the process circuit within the specified period of time, decision is made to suspend or to stop further works at the power unit (STO 1.1.1.03.004.0980-2014 "Water Chemistry of the Primary Circuit during Commissioning of the Nuclear Power Plant Unit under AES-2006 Project. Coolant Quality Standards and Supporting Means". STO1.1.1.03.004.0979-2014 "Water Chemistry of the Secondary Circuit during Commissioning of the Nuclear Power Plant Unit under AES-2006 Project. Working Medium Quality Standards and Supporting Means" at http://www.snti.ru/snips_rd3.htm).

INDUSTRIAL APPLICABILITY

The following is a specific example showing the effectiveness of this power plant chemical control system, including sensors for the electrochemical parameters of the coolant of the power installation process circuits forming a complex with heat exchangers and throttling devices with a reversible coolant supply circuit.

Example

The production prototype of the corrosion monitoring complex was mounted on one of the power units with RBMK-1000 reactor (high-power channel-type reactors). The power unit with RBMK-1000 reactor is a single-circuit power plant of a boiling type. The coolant is light water ($H_2O$) moving along the multiple forced circulation circuit connecting the channel-type reactor, the turbine and the main circulation pump. The circuit diagram of the multiple forced circulation circuit is similar to that shown in FIG. 1 (items 1, 4, 6). Organization of automatic sampling and supply of the sample to the power plant chemical control system are also similar (refer to FIG. 1, items 13, 16-20). The first option of the chemical control system production prototype configuration consisted of a cell with electrodes of an electrochemical potential sensor, a heat exchanger/cooler, a throttling device as a set of throttle orifices. The set of throttle orifices was designed to provide a pressure drop from 8 to 0.15 MPa and to maintain the coolant sample flow rate at about 20 dm$^3$/h. The electrochemical potential was measured using a typical measuring transducer and 4-20 mA signal tapping to the recording system on the typical recording chart. The water chemistry quality complied with the regulatory document (STO 1.1.1.02.013.0715-2009 "Water Chemistry of the Main Process Circuit and Auxiliary Systems of Nuclear Power Plants with RBMK-1000 Reactors" at http://www.snti.ru/snips_rd3.htm). Quality parameters changed during power operation within the following limits: from 25 to 40 μg/kg for oxygen concentration; from 0 to 2 μg/kg for hydrogen concentration; from 7 to 10 μg/kg for iron corrosion products concentration; from 0.08 to 0.27 μS/cm for the specific electrical conductivity. During the first stage of the tests, under the power unit operation at nominal power, there was a reduction in the sample flow rate. The coolant sample flow through the complex reduced by half (up to 10 dm$^3$/h) after 200 hours and to 3 dm$^3$/h after 800 hours, which corresponds to an extension in the transport lag time by six times, up to approximately 5 minutes, with the sampling tube length of 10 meters from the sampling point to the sensor. The extended transport lag time has a negative effect on the reliability of the values of the rated and diagnostic parameters of the process circuit water media. The coolant sample flow rate of (17-19) dm$^3$/h was restored as a result of the following procedures: disconnection of the complex from the multiple forced circulation circuit, removal of a set of throttling orifices from the complex, mechanical removal of iron corrosion products deposits from the internal surfaces of the set of throttling orifices, assembly of the set of throttling orifices, installation of the set of throttling orifices in the hydraulic circuit of the complex and its commissioning. Regular monitoring of the sample flow rate showed that the flow rate is gradually decreasing at almost the same rate as at the beginning of the test. A similar formation of deposits of iron corrosion products in the form of magnetic iron oxides was recorded in the regulating valve for feed water supply to the drum boiler of the combined-cycle gas-turbine unit at one of the combined heat and power plants. Cleaning the valve of deposits was required at least once a month. In order to eliminate these drawbacks, the hydraulic complex path was updated with arrangement of a reversible coolant supply circuit to a throttling device similar to that shown in FIG. 3. The upgraded complex with a throttling device with a reversible coolant supply circuit enabled to perform long-term tests (at least 5000 hours) at the rated power of the power unit, during start-up (48 to 144 hours) and shutdown (48 to 100 hours) periods. Quality indicators changed during the start-up and shutdown periods within the following limits: from 25 to 140 μg/kg for oxygen concentration; from 0 to 4 μg/kg for hydrogen concentration; from 20 to 100 μg/kg for iron corrosion products concentration; from 0.28 to 0.77 μS/cm for the specific electrical conductivity. Timely switching of the coolant flow direction through the throttling device allowed to maintain the flow rate within the limits from 15 to 18 dm$^3$/h acceptable for measurement reliability.

The invention claimed is:

1. A chemical control system for a power plant, comprising:
   at least one flow-type sensor for coolant electrochemical indication, a unit for measurement data processing and transmission, a central computer (CPC), an actuator for injection of hydrogen and chemical reagents, a sampling tube, a first heat exchanger, a first throttling device, and a coolant supply circuit;
   the at least one flow-type sensor electrically connected to the unit for measurement data processing and transmission with output of the unit being connected to the central computer, the central computer configured to control the actuator for injection of hydrogen and chemical reagents;
   a hydraulic inlet of the at least one flow-type sensor for coolant electrochemical indication is configured to be connected by the sampling tube to a process circuit of the power plant;
   a hydraulic output of the at least one flow-type sensor is hydraulically connected in series to the first heat exchanger and the first throttling device with the coolant supply circuit; and
   wherein the sampling tube is configured to pass a coolant sample to the at least one flow-type sensor for coolant electrochemical indication and the coolant supply circuit comprises tubes and valves configured to reverse a flow of the coolant sample through the first throttling device.

2. The system as defined in claim 1, wherein the at least one flow-type sensor for coolant electrochemical indication is a flow-type sensor of polarization resistance.

3. The system as defined in claim 1, wherein the at least one flow-type sensor for coolant electrochemical indication is a flow-type sensor of electrochemical potential.

4. The system as defined in claim 1, wherein said system comprises a second heat exchanger, a second throttling device, a second unit for measurement data processing and transmission, and at least one additional sensor selected from the group consisting of: a sensor for dissolved oxygen, a sensor for dissolved hydrogen, a sensor for electrical conductivity, and a pH sensor; the at least one additional sensor installed (i) between the second heat exchanger and the second throttling device or (ii) downstream of the second throttling device; and the second heat exchanger being hydraulically connected to the process circuit, and the at least one additional sensor being electrically connected to the second unit for measurement data processing and transmission with output of the second unit being connected to the central computer.

5. The system as defined in claim 1, wherein the process circuit is a primary process circuit of the power plant.

* * * * *